June 2, 1970  R. A. JOHNSON  3,516,029
MECHANICAL FILTERS EMPLOYING MULTI-MODE RESONATORS
Filed Feb. 6, 1967  9 Sheets-Sheet 1

FIG. 2a  $f_1 = 415$ KHz

FIG. 2b  $f_2 = 422$ KHz

FIG 3

INVENTOR.
ROBERT A. JOHNSON
BY
Moody and Phillion
ATTORNEYS

*INVENTOR.*
*ROBERT A. JOHNSON*

United States Patent Office 3,516,029
Patented June 2, 1970

3,516,029
MECHANICAL FILTERS EMPLOYING
MULTIMODE RESONATORS
Robert A. Johnson, Tustin, Calif., assignor to Collins Radio Company, Cedar Rapids, Iowa, a corporation of Iowa
Filed Feb. 6, 1967, Ser. No. 614,185
Int. Cl. H03h 9/20
U.S. Cl. 333—71                               8 Claims

ABSTRACT OF THE DISCLOSURE

This is a mechanical filter of the stacked disc type employing multi-diameter mode type discs which have two diameter mode frequencies; one lying inside the passband and one lying just outside the passband. By proper positioning of the coupling wires there is produced an attenuation pole between the two frequencies. Two such multi-diameter mode discs can be employed to produce an attenuation pole near the lower edge of the passband and an attenuation pole near the upper edge.

This invention relates generally to mechanical filters of the stacked disc type and, more particularly, to a mechanical filter of the stacked disc type which realizes infinite attenuation poles through the use of multi-mode mechanical resonators.

Because of their superior frequency cut-off characteristics, mechanical filters today enjoy a rather extensive use in high-quality electronic gear. The most widely used type mechanical filters are comprised of a plurality of discs stacked concentrically, one upon the other, and spaced apart a predetermined distance which is less than one wavelength of the nominal center frequency of the filter passband. The discs are held in such position by means of coupling wires which extend along the side of the stack and which are secured to the perimeters of the discs. Vibraration of the discs can occur in several different types of modes including, for example, circular modes, diameter modes, as well as modes containing both nodal circles and nodal diameters. The circular (or circle mode) vibration of the discs is most commonly employed and has an action something like the bottom of an oil can, with the nodes being circular and concentric around the axis of the disc. The diameter mode of vibration has its nodes lying along diameters of the disc. In the two-diameter mode case, the two diameter nodes lie along diameters positioned at 90 degrees from each other, thereby dividing the disc into four sectors.

Through the use of certain combinations of diameter mode discs and circle mode discs, and with various systems of coupling wires and bridging wires, mechanical filters have been designed which exhibit attenuation poles either on the upper side of the passband or the lower side of the passband, or at both sides. Such prior art mechanical filters are disclosed in U.S. patent application, Ser. No. 553,520, filed May 27, 1966 by Donald L. Bise and entitled "Mechanical Filter Section With Envelope Delay Compensation Characteristic"; U.S. patent application, Ser. No. 547,947, filed May 5, 1966 by Robert A. Johnson and Roger J. Teske, entitled "A Mechanical Filter Having General Stophand Characteristics"; U.S. patent application, Ser. No. 557,300, filed June 13, 1966 by Donald L. Bise and entitled "Mechanical Filter With Attenuation Poles on Both Sides of Passband"; and U.S. Pat. 3,135,933 issued to Robert A. Johnson on June 2, 1964 and entitled "M-Derived Mechanical Filter."

The above prior art reveals that the attenuation poles present just beyond the upper and lower edges of the response curves thereof are created by unique arrangements of diameter mode discs and circle mode discs, conventional coupling wires and bridging wires which function to produce a cancellation of energy at either the upper side or the lower side of the filter passband.

In order to provide the background for understanding of the present invention, consider briefly tthe structure of the above-identified U.S. patent application, Ser. No. 553,520, by Donald L. Bise. In this structure there is provided a mechanical filter section comprised of four discs positioned in a stacked arrangement with the axis of each of the four discs lying along a common line. The first disc is a diameter mode type disc, and the second disc, the third disc, and the fourth disc are circle mode type discs. The said discs are positioned in the order mentioned above and rigidly held in such position by conventional coupling wires extending along said stack and secured to the perimeters of each of said four discs. Such conventional coupling wires are secured to the perimeter of said diameter mode type disc at points all having the same phase of vibration. It is to be understood that in a diameter mode type vibration, each sector vibrates in a phase which is 180 degrees removed from the phase of vibration of the adjoining sector.

The second and third discs are segmented, i.e., a portion of the edges thereof are removed to provide clearance for a bridging wire extending from the first to the fourth disc. Such bridging wire is connected to a particular sector of the diameter mode disc (the first disc) whose phase of vibration is 180 degrees removed from those sectors to which the conventional coupling wires are attached. Thus at the high end of the passband, where the phase shift between adjacent discs is 180°, there will be a total phase shift of 3×180°, or 540° through the four discs due to the energy supplied through the conventional coupling wires. The 540° is, of course, equivalent to 180°.

On the other hand, the phase shift of the energy transferred from the first disc, i.e., the diameter disc, to the fourth disc over the bridging wire also experiences a phase reversal of 180°. However, since the bridging wire is coupled to a segment of the diameter mode disc whose phase is 180° removed from that of the segment to which the conventional coupling wires are connected, the overall result is that the energy supplied from the diameter mode disc, to the fourth disc, experiences a 360° phase shift and tends to cancel the energy supplied to the fourth disc along the conventional coupling wires. A cancellation of such energy does not occur, however, until the frequency has moved just above the upper skirt of the passband. The reason for the above is as follows. In the passband, the energy transferred along the conventional coupling wires is presented with a relatively low impedance so that the attenuation of the energy from disc to disc is relatively small. Consequently, since the energy transferred from disc to disc is proportional to the cross-sectional area of the coupling wires is considerably greater than that of the bridging wire, the amount of energy transferred through the conventional coupling wires is much greater than that transferred through the bridging wire. Thus, within the passband very little cancellation of energy occurs. However, once the frequency rises above the passband the attenuation at each connection between a conventional coupling wire and a disc rises very sharply so that the amount of energy transferred from disc to disc becomes very small, with attenuation occurring at each of the four discs. On the other hand, the bridging coupling wires are connected to only two discs, the first and the fourth discs, so that the total attenuation through the bridging wire is relatively small. Thus at the upper end of the passband a point is reached where the energy transferred over the bridging wire is equal to the energy transferred over the conventional coupling wires. At this point the energies cancel each other out since they are opposed in phase by 180°, and an attenuation pole is obtained.

At the lower end of the passband where the phase shift from disc to disc is 0 degrees, the cancellation feature is also present. More specifically, the signal transferred between adjacent discs experiences substantially no phase change. However, since the bridging wire is connected to a segment of the diameter mode disc whose phase is 180° removed from that of those segments to which the conventional coupling wires are connected, the energy transferred from the diameter mode disc through the bridging wire to the fourth disc is 180° removed from the energy transferred along the conventional coupling wires. Thus an attenuation pole is created at the lower end of the passband. It can be seen that the above-described prior art means of obtaining attenuation poles employs the use of diameter mode discs, circular mode discs, and bridging wires, and although the structure produces good characteristics and is commercially feasible, it is quite complex.

It is an object of the present invention to obtain attenuation poles through the use of diameter mode discs and conventional coupling wires and without bridging wires.

Another object of the present invention is to obtain attenuation poles at either the upper or lower level of the passband, or both the upper and lower levels of the passband, through the use of multimode discs.

A third object of the invention is to obtain attenuation poles through the employment of multi-diameter mode discs and requiring a less complex coupling wire arrangement than has been known heretofore.

A fourth object of the invention is to improve, generally, mechanical filters having response curves bounded by finite attenuation poles.

In accordance with the invention, there is provided a stacked arrangement of a first circle mode disc, and a second multi-diameter mode disc, and a third circle mode disc, all positioned with the axes thereof lying along a common line. A plurality of coupling wires extend along the stack of discs substantially parallel to said center line and attached to the perimeter of each disc. The multimode diameter disc is constructed to have at least two diameter modes of operation, with the diameter nodal lines of each diameter mode being displaced from the nodal lines of the other diameter mode an angle $\theta$, where $\theta$ is, for the two-diameter mode case, equal to about 45°, although other values of $\theta$ can be realized. In any given diameter mode of operation, the diameter nodal lines divide the disc into pie-shaped sectors with the phase of vibration of any sector at the perimeter of the disc being 180° removed from the phase of vibration of the adjacent sectors. The coupling wires are arranged in pairs with the two coupling wires of each pair being positioned diametrically on the disc perimeter, and further being positioned around said disc perimeter so that with any given diameter mode of operation at least one pair of coupling wires will lie along a diameter nodal line and another pair of coupling wires will lie near the center of a sector; i.e., substantially midway between the points where two nodal lines entered the disc perimeter. During the other diameter mode vibration the said second pair of conventional coupling wires will lie along a diameter nodal line, and the said first pair of coupling wires will lie substantially near the center of a sector.

By weighting a disc or, alternatively, by segmenting a disc, i.e., slicing off a portion of the perimeter thereof, the disc can be caused to have two diameter modes of operation at frequencies which are fairly close to each other. For example, it is possible to weight a disc so it will have two diameter modes of operation, one at 415 kHz. and the other at 422 kHz., for example, with the two quadrature spaced nodal lines of each diameter mode being displaced by about 45°.

Either the higher or the lower natural frequency of the two diameter modes can be caused to lie in the passband and the other natural resonance to lie either below or above the passband, thus selectively providing an attenuation pole either at the lower side of the passband or at the upper side of the passband. As will be shown later herein, by analogizing the mechanical filter to electrical circuits, an attenuation pole exists between the two natural resonant frequencies, which attenuation pole can be made to lie near the edge of the passband.

Worded in another way, within the passband one of the pairs of coupling wires is positioned along a nodal line created by a first diameter mode of the disc lying within the passband, while the second pair of coupling wires lies in between the nodal lines. The energy is transferred to and from the diameter mode disc by said second pair of coupling wires in said first mode. The second diameter mode resonant frequency of the disc would then lie either above or below the passband depending upon which mode was selected to lie within the passband. At the second resonant frequency the second pair of coupling wires will lie along the nodal lines and the first pair of coupling wires lie in between the nodal lines and will function to cause the transfer of energy. In between the first and the second natural resonant frequencies an attenuation pole occurs.

In accordance with a further feature of the invention, two multi-diameter mode discs, employed in the same mechanical filter structure, are cut so that one of the multi-mode discs produces an attenuation pole at the lower end of the passband and the other multi-mode disc produces an attenuation pole at the upper end of the passband.

The above-mentioned and other objects and features of the invention will be more fully understood from the following detailed description thereof when read in conjunction with the drawings in which.

In the following specification the basic prototype filter circuits of FIGS. 1a, 1b, and 1c will be discussed with particular emphasis on the circuit of FIG. 1c which has a characteristic of producing a frequency response curve with a finite attenuation pole which can be caused to be either at the upper or the lower skirt of the passband. As will be discussed in detail later herein, the finite attenuation poles are caused by the presence of the two tuned circuits 29 and 30 of FIG. 1c.

Figure 4:
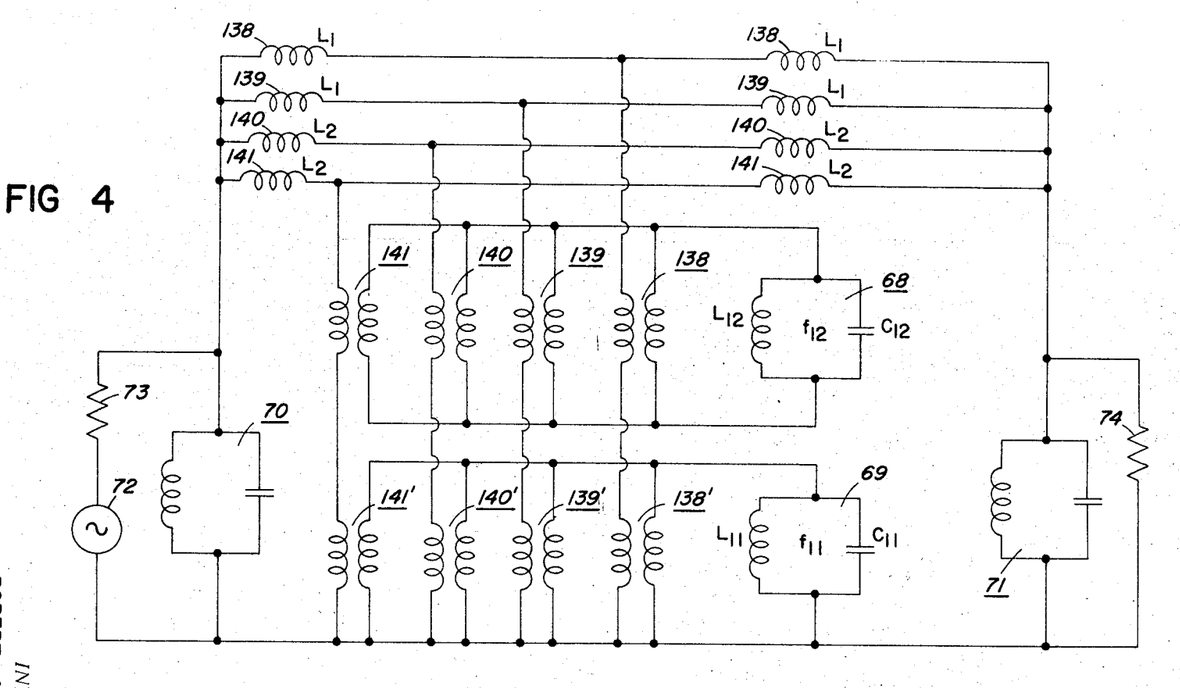
FIG. 4 is a schematic diagram of the electrical equivalent circuit of the structure of FIG. 3 with each connection of the four coupling wires of FIG. 3 being individually represented by an impedance, which impedance is shown as a transformer in FIG. 4.

The specification will then discuss the characteristics of a multi-diameter mode type disc and the utilization thereof in a three-disc filter section. A detailed schematic diagram of the equivalent circuit of the three-disc filter of FIG. 4 will then be discussed, followed by a series of circuit transformation showing how the equivalent circuit of FIG. 4 is the same as the circuit of FIG. 1c.

The specification will accordingly be organized in the following manner:

(I) Discussion of basic electrical filter prototypes of mechanical filters.

(II) The nature and use of a multi-diameter mode type disc.

(III) General description of mechanical filter section and equivalent electrical circuit thereof.

(IV) Discussion of the circuit transformation employed herein.

(V) General conclusions.

(I) DISCUSSION OF BASIC ELECTRICAL FILTER PROTOTYPES OF MECHANICAL FILTERS

Figure 1A:
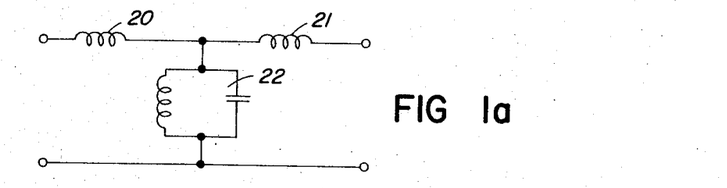
FIGS. 1a, 1b, and 1c show basic electrical filter networks which are the electrical equivalent of basic disc type mechanical filter sections.

Referring now to FIG. 1a, there is shown the electrical equivalent of one disc with a coupling wire leading to the disc and from the disc. The disc is represented by the tuned circuit 22 and the coupling wires are represented by the inductors 20 and 21. Such representation is quite conventional and well known in the art. The frequency response curve for the circuit of FIG. 1a has a flared skirt with no finite attenuation poles therein.

Figure 1B:
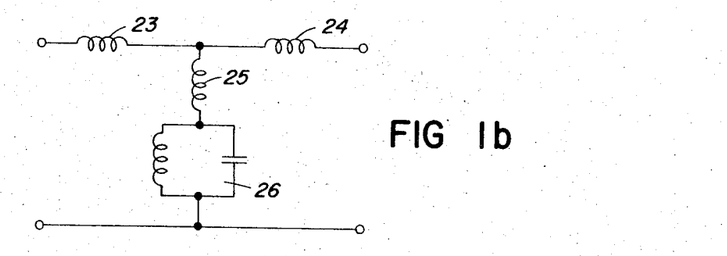

In FIG. 1b there is shown a section of an electrical filter circuit generally known as an "M" derived filter section. The theory of "M" derived filters is well known in the art and has as a principal feature the existence of an attenuation pole in the skirt above the passband's upper edge. Such attenuation pole is caused by the presence of the inductor 25 which functions basically in the following manner. As the frequency rises through the passband towards its upper limit the tuned circuit 26 becomes capacitive in nature. The values of the inductor 25 and the values of the tank circuit 26 are chosen so that a series circuit consisting of the inductor 25 and the capacitive reactance of tank circuit 26 occurs just above the upper end of the passband, thus creating a resulting attenuation pole. A mechanical filter circuit having sections whose equivalent circuit is that of FIG. 1b is described in the aforementioned U.S. Pat. 3,135,933.

Figure 1C:
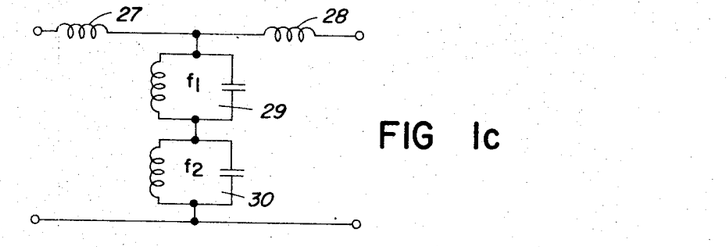

In FIG. 1c there is shown a filter section in which inductors 27 and 28 represent the coupling wires but in which there are two tank circuits 29 and 30, which represent the two diameter-circle modes of a disc. These two tank circuits have different antiresonant frequencies which will be designated as $f_1$ and $f_2$, respectively.

By selecting the values of the components of tank circuits 29 and 30 so that frequency $f_1$ lies either above or below the passband and frequency $f_2$ lies within the desired passband, an attenuation pole can be created at the upper skirt or the lower skirt of the passband, respectively. More specifically, if $f_1$ is caused to be greater than $f_2$ so that $f_1$ lies outside the passband by a frequency interval substantially equal to one-half the frequency band of the passband, the reactance of the tank circuit 29 will be inductive in the upper skirt of the passband and the reactance of the tank circuit 30 will be capacitive. By proper selection of the component values of the two tank circuits 29 and 30, a resonant series circuit condition will then exist at the upper skirt of the passband, thereby creating an attenuation pole.

Similarly if $f_1$ is caused to lie below the passband by a frequency interval substantially equal to one-half the frequency range of the passband, tank circuit 29 will be capacitive in nature at the lower skirt of the passband, whereas tank circuit 30 will be inductive. Thus a series tuned resonant condition is caused to exist, thereby creating a finite attenuation pole in said lower skirt.

As discussed above, the two tank circuits 29 and 30 of FIG. 1c are the electrical equivalent of a disc having two modes of vibration. However, due to complex relationship introduced by the interaction of the coupling wires and the two natural modes of vibration represented by tank circuits 29 and 30, a mechanical filter section having an electrical equivalent shown in FIG. 1c cannot be obtained simply by inserting a multi-mode disc in a mechanical filter. To obtain the result of the equivalent circuit shown in FIG. 1c, the multimode disc must be a multi-diameter mode type disc with two diameter modes of vibration whose frequencies are spaced closely enough together to obtain the series tuned circuit equivalent at the upper or lower skirt of the passband, as described above. Furthermore, the coupling wires supporting the multi-diameter mode disc to the discs on either side thereof must be positioned very precisely to provide a generalized equivalent circuit, such as shown in FIG. 4, which can be transformed into the circuit of FIG. 1c. Worded in a more qualitative manner, the coupling wires must be positioned so that one natural mode of vibration does not interfere with the other mode of vibration in a degenerative or distorted manner, while at the same time utilizing the two natural modes of vibration to obtain the desired attenuation pole.

(II) THE NATURE AND USE OF A MULTI-DIAMETER MODE TYPE DISC

Before discussing the equivalent circuit of FIG. 4, a discussion of a multi-diameter mode type disc will be set forth, followed by a description of a three-disc mechanical filter section employing such a multi-diameter mode type disc.

Figure 2A:
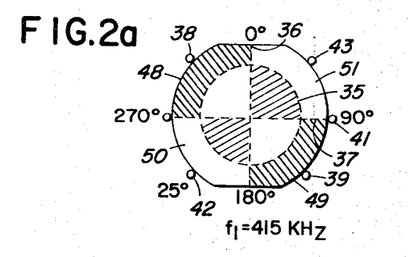
FIGS. 2a and 2b show the two diameter-circle mode natural resonant conditions of a segmented disc.

As discussed above, a disc can vibrate either in a circle mode or a diameter mode. A third type of vibrational mode includes both a circle type mode and a diameter mode, as shown in FIG. 2a. This hybrid type of vibration is referred to herein as a diameter-circle mode of vibration. In FIG. 2a the circle-mode portion of the vibration has a node as represented by the dotted circle 35 and the diameter mode of vibration has nodes lying along the diameters represented by lines 36 and 37. In the present invention the diameter mode type operation is of primary interest, with the circle mode portion being only of incidental interest.

It should be noted that the hybrid motion of FIG. 2a is of particular significance in that it occurs at a much higher frequency than a simple diameter mode type vibration. More specifically, the frequency of the hybrid motion of FIG. 2a occurs between 400 kHz. and 500 kHz., wherein a simple diameter type mode operation for the same size disc would occur in the neighborhood of 60 to 70 kHz.

The specific orientation of the nodes of diameter mode type vibration in free vibration are determined by the inherent mass distribution and even possibly the crystalline structure of any given disc. Such orientation of the diameter mode nodes can be definitely controlled, however, by mass loading the discs. Mass loading of a disc can occur basically in one of two ways; i.e., either by adding small weight to the perimeter of the disc, or by removing mass from the edge of the disc. In the disc of FIG. 2a mass has been removed from the top and the bottom of the disc, thus orienting the diameter mode nodal lines 36 and 37 as shown in FIG. 2a. It should be noted that even without removing a portion of the disc, the mere fact that coupling wires are attached to the perimeter of a disc will function as a loading factor and will orient the diameter mode nodal lines.

Figure 2B:
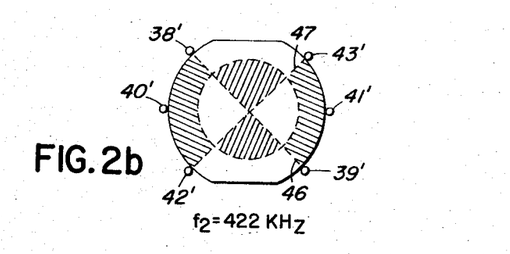

It is a further characteristic of mass loaded discs that by such loading an additional diameter mode of vibration will occur near the first (free) diameter mode of vibration. Thus a second diameter-circle mode of vibration, as shown in FIG. 2b, will exist in a disc which is mass loaded as shown in FIG. 2. Typical examples of the frequencies obtainable with such modes of vibration and such mass loading are shown in FIGS. 2a and 2b with the structure of FIG. 2a having a frequency of 415 kHz. and that of 2b having a frequency of 422 kHz. The difference in frequency between the two modes of vibration is approximately 7 kHz.

The disc of FIG. 2 has two pairs of coupling wires and one pair of short loading wires thereon. The two pairs of coupling wires are comprised of a first pair of coupling wires 40 and 41 and a second pair of coupling wires 38 and 39, with the wires of each pair being diametrically positioned on the disc. The mass loading short wires are identified by reference characters 42 and 43 and are also diametrically positioned on the disc.

It is to be noted that the two pairs of coupling wires are each positioned so that they lie on a diameter nodal line. More specifically, coupling wires 40 and 41 lie on diameter node 37 of FIG. 2a and coupling wires 38 and 39 lie along diameter nodal line 46 of FIG. 2b. The mass loading wires 42 and 43 lie along the diameter nodal line 47 and, in fact, are important in determining the orientation of nodal line 47 and in preventing shifting or wandering of said nodal line 47.

It is to be noted that the diameter nodal lines in both FIGS. 2a and 2b are positioned in quadrature, and further, that the nodal lines of FIGS. 2a and 2b are shifted apart 45° with respect to each other. A further characteristic of the diameter-circle mode type disc of FIG. 2 is the phase relation of various segments of the disc during vibration. Such phase relation can be generalized as follows. All of the shaded portions of FIG. 2a or 2b vibrate 180° out of phase with the unshaded portion. Thus, for example, the shaded segments 48 and 49 vibrate 180° out of phase with the segments 50 and 51.

Figure 3:
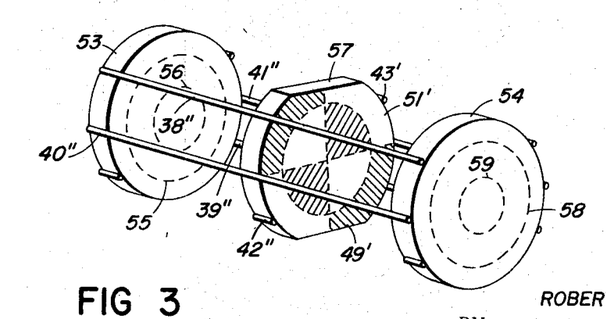
FIG. 3 is a perspective view of a three-disc mechanical filter section employing a segmented diameter-circle mode disc to obtain a frequency response curve having an attenuation pole either at the upper or the lower edge of the frequency response characteristic.

The utilization of a multi-diameter mode type disc, as shown in FIG. 2, in a three-disc mechanical filter section, as shown in FIG. 3, will now be discussed.

(III) GENERAL DESCRIPTION OF MECHANICAL FILTER SECTION AND EQUIVALENT ELECTRICAL CIRCUIT THEREOF

In FIG. 3 there is shown a three-disc mechanical filter section with the center disc 57 being a multi-diameter mode disc of the type shown in FIG. 2. The two end discs 53 and 54 are two-circle mode type discs with the nodal lines represented by dotted circles 55, 56, and 58, 59, respectively.

The coupling wires 38″, 39″, 40″, and 41″ are connected to the perimeter of the multi-diameter mode disc 57 at the locations indicated in FIG. 2a. The loading short wires 42″ and 43″ are also connected to disc 57, as shown in FIG. 2.

For purposes of example, the mode of vibration of disc 57 in FIG. 3 is shown as corresponding to that in FIG. 2a. It is to be understood, of course, that at frequency $f_2$ the mode of vibration will be as shown in FIG. 2b.

At a given frequency, such as the one shown in FIG. 3, the impedance presented to the coupling wires connected to a diameter nodal line is different from the impedance presented to the coupling wire connected in between two diameter nodal lines. For example, coupling wires 40″ and 41″ are shown connected at the end of a diameter nodal line, whereas coupling wires 38″ and 39″ are shown connected in between two diameter nodal lines. Under such circumstances, the mechanical impedance presented to coupling wires 40″ and 41″ is very high and, under perfect conditions, would be infinite. On the other hand, the equivalent electrical impedance, when using the velocity-voltage analogy thereof, would be zero, i.e., would be a short circuit. The mechanical impedance presented to the coupling wires 38″ and 39″, however, is less than infinite and, in fact, is a finite, measurable mechanical impedance which can be represented by a finite electrical impedance, as will be discussed below.

Each of the connections between a coupling wire and the disc 57 can be represented by a transformer which functions to reflect the actual impedance of the disc into the coupling wires. Such transformers are shown in FIG. 4. More specifically, transformers 138 through 141 in FIG. 4 represent the connections between the coupling wires and the disc 57 for the vibration mode represented by tank circuit 68, and transformers 138′ through 141′ represent the connections between the coupling wires and disc 57 for the mode of vibration represented by tank circuit 69.

The coupling wires 38″ through 41″ of FIG. 3 are represented by the coils 138, 138′, 139, 139′, 140, 140′, 141, and 141′ of FIG. 4. Such coupling wires connect tank circuit 70 to tank circuit 71 in FIG. 4, which tank circuits represent, respectively, the discs 53 and 54 of FIG. 3.

It is to be understood that with respect to disc 57 the mode of vibration represented in FIG. 3 is only one of the two multi-diameter modes of vibration utilized in the operation of the device. The particular mode of vibration shown in FIG. 3 is similar to that shown in FIG. 2a. However, at frequency $f_2$, the mode of vibration of disc 57 of FIG. 3 would be the same as that shown in FIG. 2b. Under which conditions the coupling wires 38″ and 39″ would lie along a diameter nodal line and the coupling wires 40″ and 41″ would lie in between two diameter nodal lines, as shown in FIG. 2b.

Also shown in FIG. 4 is a driving source 72, a driving source impedance 73, and an output load resistor 74, all of which are not represented or corresponding equivalents in the structure of FIG. 3.

Thus the circuit of FIG. 4 is established as being the electrical equivalent of the three-disc filter section of FIG. 3. The means by which the circuit of FIG. 4 is transformed into the circuit of FIG. 1c will be discussed in the following section.

Figure 5:
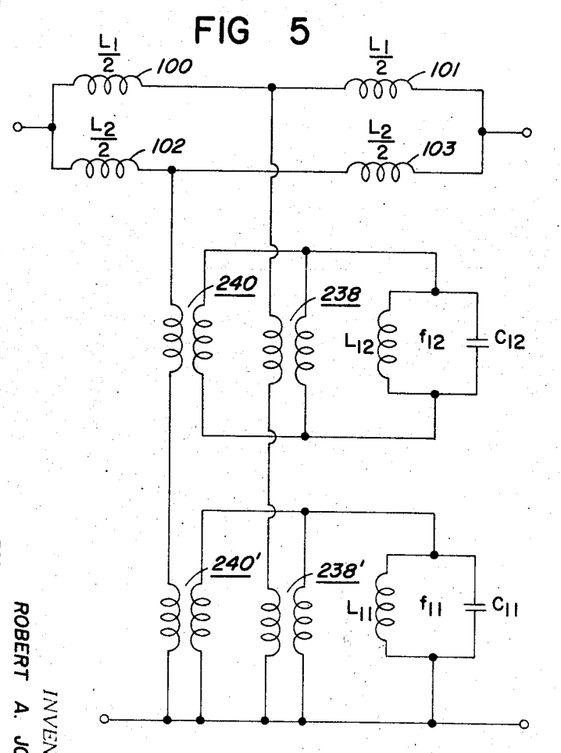
FIGS. 5, 6, 7, 8, 9, 10, 11, and 12 show a series of circuit transformations transforming the circuit of FIG. 4 into the circuit of FIG. 12, which is the same as the circuit of FIG. 1c and which shows that the frequency response curve of the circuit of FIG. 3 has finite attenuation poles.

(IV) DISCUSSION OF CIRCUIT TRANSFORMATIONS EMPLOYED HEREIN (A) Transformation of circuit of FIG. 4 to the circuit of FIG. 5

As discussed above, coupling wires 38″ and 39″ of FIG. 3 are diametrically positioned as are coupling wires 40″ and 41″. Since the impedance presented to diametrically opposed coupling wires by disc 57 is exactly the same, such diametrically opposed coupling wires can be combined into a single wire of twice the diameter. Similarly, in the electrical circuit the two transformers representing the connections for a pair of diametrically opposed coupling wires for any given particular mode of vibration can be combined into a single transformer. Thus, in FIG. 4 the transformers 141 and 140 can be combined into a single transformer 240 of FIG. 5. Similarly, the transformer 141′ and 140′ in FIG. 4 can be transferred into a single transformer 240′ of FIG. 5; the transformers 139 and 138 of FIG. 4 into the single transformer 238 of FIG 5; and the transformers 139′ and 138′ into the single transformer 238′ of FIG. 5.

Figure 6:
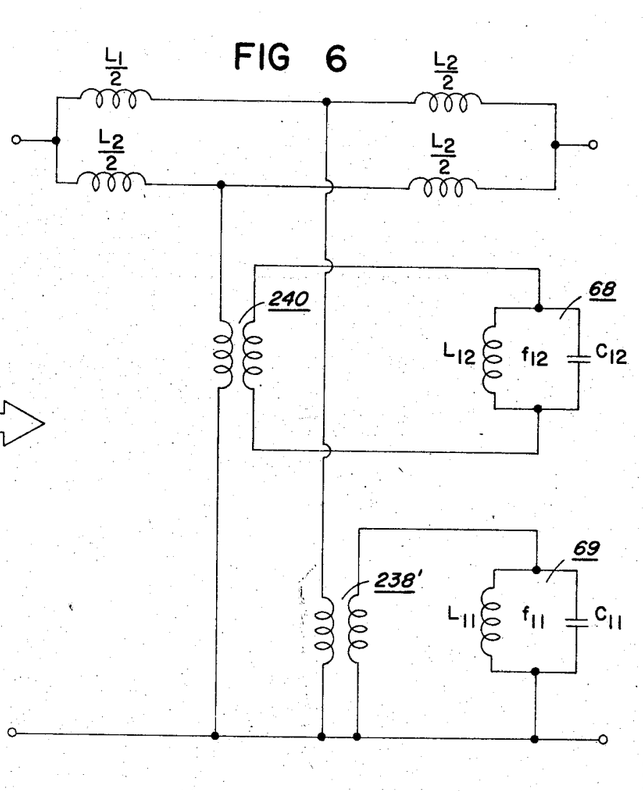

(B) Transformation of the circuit of FIG. 5 into the circuit of FIG. 6

As discussed above, the impedance presented by the diameter mode disc to the coupling wires is infinite if the coupling wires are positioned on a diameter nodal line. Thus for the diameter mode resonant condition shown in FIG. 3, the impedance presented to coupling wires 40″ and 41″ is infinite. Since infinite mechanical impedance is equivalent to zero electrical impedance, the transformer 240′ of FIG. 5, which represents the coupling of the coupling wires 41″ and 40″ to disc 57 at diameter mode frequency $f_1$, is equivalent to a short circuit and can be removed. Similarly, at the diameter mode frequency $f_2$, coupling wires 38″ and 39″ lie along a diameter nodal line so that disc 57 represents an infinite impedance thereto, which infinite impedance is represented in the equivalent electrical circuit as a short circuit. Thus transformer 238, which represents the connections between coupling wires 38″ and 39″ and disc 57 at frequency $f_2$, can be represented by a short circuit, as shown in FIG. 6.

Figure 7:
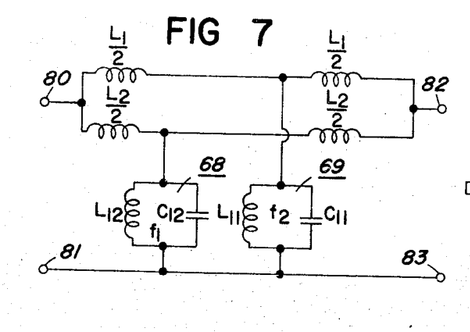

(C) Transformation of circuit of FIG. 6 to the circuit of FIG. 7

The transformation of the circuit of FIG. 6 to that of FIG. 7 is accomplished essentially by sealing the impedance level of tank circuits 68 and 69 by the value of the turns ratio (primary turns over secondary turns, of transformers 238′ and 240) squared. Thus $L_{12}$ of FIG. 7 is equal to $L_{12}$ of FIG. 6 times the square of the turns ratio of transformer 240, and $C_{12}$ of FIG. 7 is equal to $C_{12}$ of FIG. 6 divided by the squares of the turns ratio.

Figure 12:
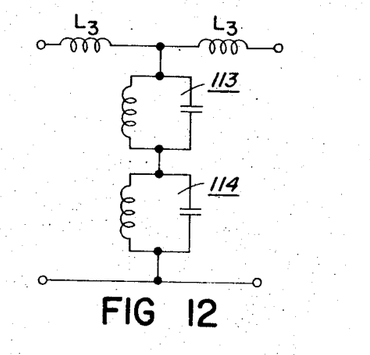
Figure 13:
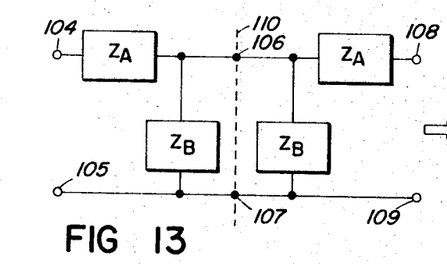
FIGS. 13 through 18 show auxiliary circuit transformations employed in the transformations of FIGS. 5 through 12.

In the design of any particular filter such changes of component values in the circuits, must be accounted for in the ultimate equivalent circuit obtained, as shown in FIGS. 12 and 1c, and the design parameters of the actual filter are determined accordingly.

Thus in FIG. 7 the inductors $L_{12}$ and $L_{11}$ actually are not necessarily the same inductors $L_{12}$ and $L_{11}$, as shown in FIG. 6, but are used primarily to differentiate between the tank circuits and to associate the two tank circuits, respectively, with the two multi-diameter modes of resonance $f_2$ and $f_1$ of the multi-diameter mode disc.

Figure 9:
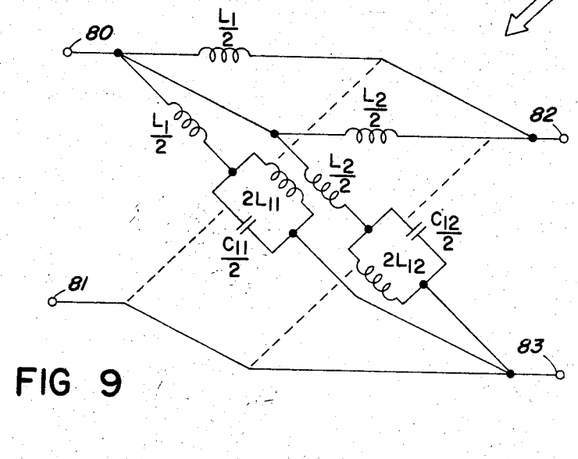

(D) Transformation of the circuit of FIG. 7 to the circuit of FIG. 9

The transformation of the circuit of FIG. 7 into the circuit of FIG. 9 is accomplished with the use of the theorem known as Bartletts bisection theorem. In accordance with Bartlett's theorem, a symmetrical ladder-type circuit can be transformed into a lattice-type circuit by employing the short-circuited and open-circuited driving point impedances of one-half of the symmetrical ladder-type circuit as the arms of the lattice network.

Figure 15:
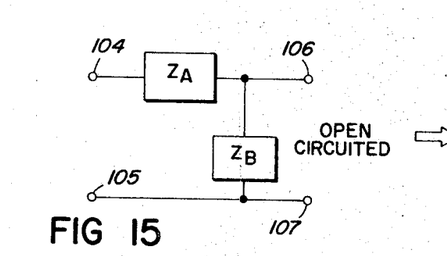
Figure 16:
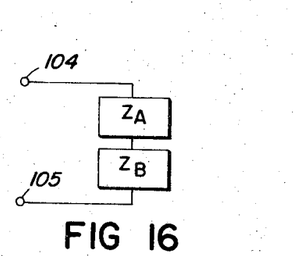
Figure 17:
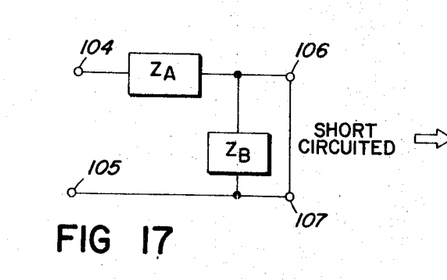
Figure 18:
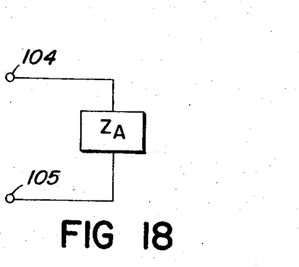

Reference is made to FIG. 13 through FIG. 18, inclusively, for a brief explanation of Bartlett's theorem. Consider first the circuit of FIG. 13 in which there is shown a symmetrical ladder-type circuit divided into two identical half circuits by a vertical dotted line 110. Considering now only that half of the circuit lying to the left of dotted line 110, the open-circuited impedance thereof, looking into terminals 104 and 105, is shown in FIGS. 15 and 16. The short-circuited impedance of said circuit to the left of dotted line 110 is shown in FIGS. 17 and 18.

Figure 14:
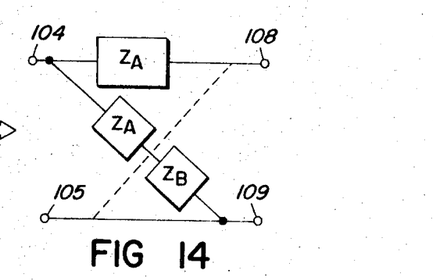

To form the lattice network of FIG. 14 in accordance with Bartlett's bisection theorem, the short-circuited impedance of FIG. 18 is used as the series impedance arms of the lattice type network, and the open-circuited impedance, of FIG. 16, is employed as the parallel arm impedances.

In applying Bartletts bisection theorem to FIG. 7, it is first necessary to change each of the tank circuits 68 and 69 into two equal tank circuits. Thus in FIG. 8 the tank circuits 90 and 91 are the electrical equivalent of the tank circuits 68 of FIG. 7, and the tank circuits 92 and 93 are the electrical equivalent of the tank circuit 69.

Figure 8:
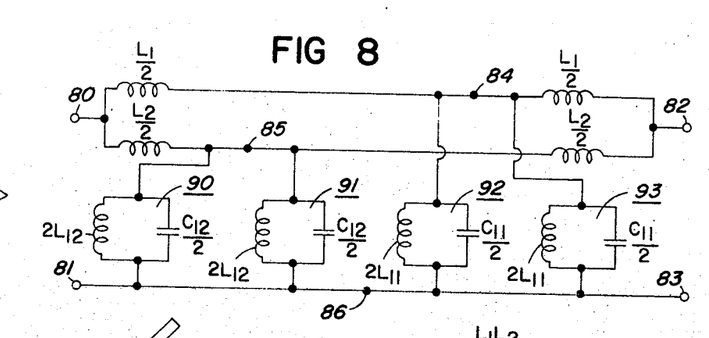

Consequently, in FIG. 8 there are two symmetrical ladder type circuits in parallel. The first of these ladder type circuits is comprised of the two $L_2/2$ inductors and tank circuits 90 and 91. The second ladder type networks is comprised of the two inductors $L_1/2$ and tank circuits 92 and 93.

By applying Bartlett's theorem to each of these two symmetrical ladder type circuts in parallel, the circuit of FIG. 9 is derived which consists of two lattice type networks in parallel.

Figure 10:
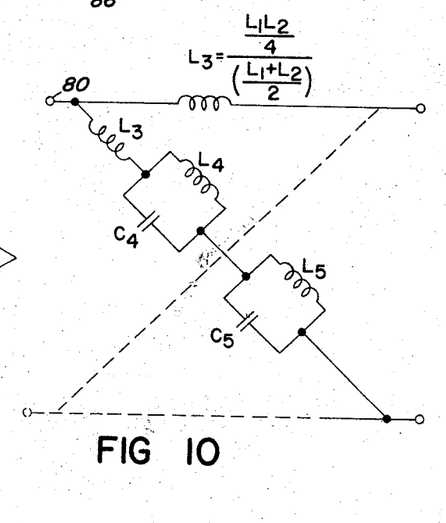

In transforming the circuit of FIG. 9 into that of FIG. 10, each of the diagonal arms of FIG. 9, comprised of a series combination of an inductor and a tank circuit, is first converted into its equivalent circuit comprising an inductor and a series tuned circuit in parallel. The series tuned circuit of the two diagonal arms, which are also in parallel, can now be combined to form a single diagonal arm comprised of a coil, a first series tuned circuit and a second series tuned circuit, all arranged in parallel. The last step in converting the circuit of FIG. 9 is to transform the immediately aforementioned parallel circuit into its equivalent series circuit consisting of the inductor $L_3$, the tank circuit consisting of $C_4$ and $L_4$, and the tank circuit consisting of $C_5$ and $L_5$, all of FIG. 10.

(F) Transformation of the circuit of FIG. 10 to the circuit of FIG. 12

In transforming the circuit of FIG. 10 to the circuit of FIG. 12, the application of Bartlett's bi-theorem in reverse is employed. More specifically, it can be seen that the circuit of FIG. 11 can be transformed into the circuit of FIG. 10 by the application of Bartlett's theorem. Conversely, the circuit of FIG. 10 can be transformed into the circuit of FIG. 11.

Figure 11:
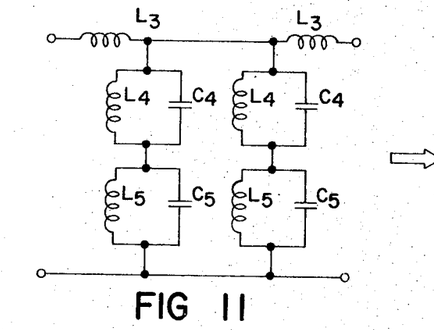

The circuit of FIG. 12 is formed by combining the parallel four tank circuits of FIG. 11 into the two tank circuits of FIG. 12.

It will be noted that the circuit of FIG. 12 has the same topology as the circuit of FIG. 1c and, consequently, has the same overall electrical characteristics. Thus it has been shown that the three-disc mechanical filter section of FIG. 3 has an equivalent electrical circuit, as shown in FIG. 12, or in FIG. 1c. Consequently, specific design parameters can be selected for said three-disc filter to produce an attenuation pole either at the upper end of the passband or at the lower end of the passband, as discussed in detail hereinbefore.

(VI) GENERAL CONSIDERATIONS

In the construction of any specific multi-mode mechanical filter, it is important that the coupling wires fall on the diameter nodal line for the following reason. Since the velocity distribution around the circumference of the disc is sinusoidal and the impedance for equivalent mass of the disc at any given point is proportional to the velocity squared, it is evident that the most sensitive point on the disc resonators are the nodes. Thus small variations in wire placement near a node can result in relatively large variations of equivalent mass.

A second consideration in the design of any specific multi-mode filter arises from the fact that a five diameter mode of vibration is located several kHz. below the lowest segmented diameter-circle mode. As can be seen in FIG. 2, the lowest frequency for the specific disc shown therein is 415 kHz. The five diameter mode of vibration, shown in FIG. 19, occurs about 6 kHz. below 422 kilocycles, or at about 416 kilocycles.

Such five diameter mode is an undesirable mode and should be eliminated. The elimination of this mode can be effected by always maintaining an exact 180° angular relationship between the coupling wires as shown in FIGS. 2 and 3 and, further, by making the coupling wires of each pair of coupling wires of equal size.

Figure 20:
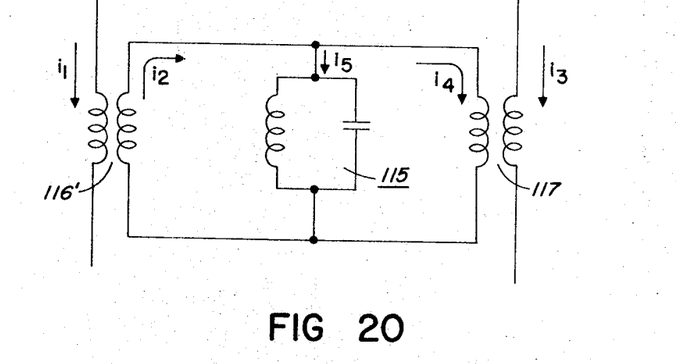
FIG. 20 is an equivalent circuit diagram illustrating how the effect of the diameter mode of FIG. 11 is eliminated by the proper positioning of the coupling wires.
Figure 21:
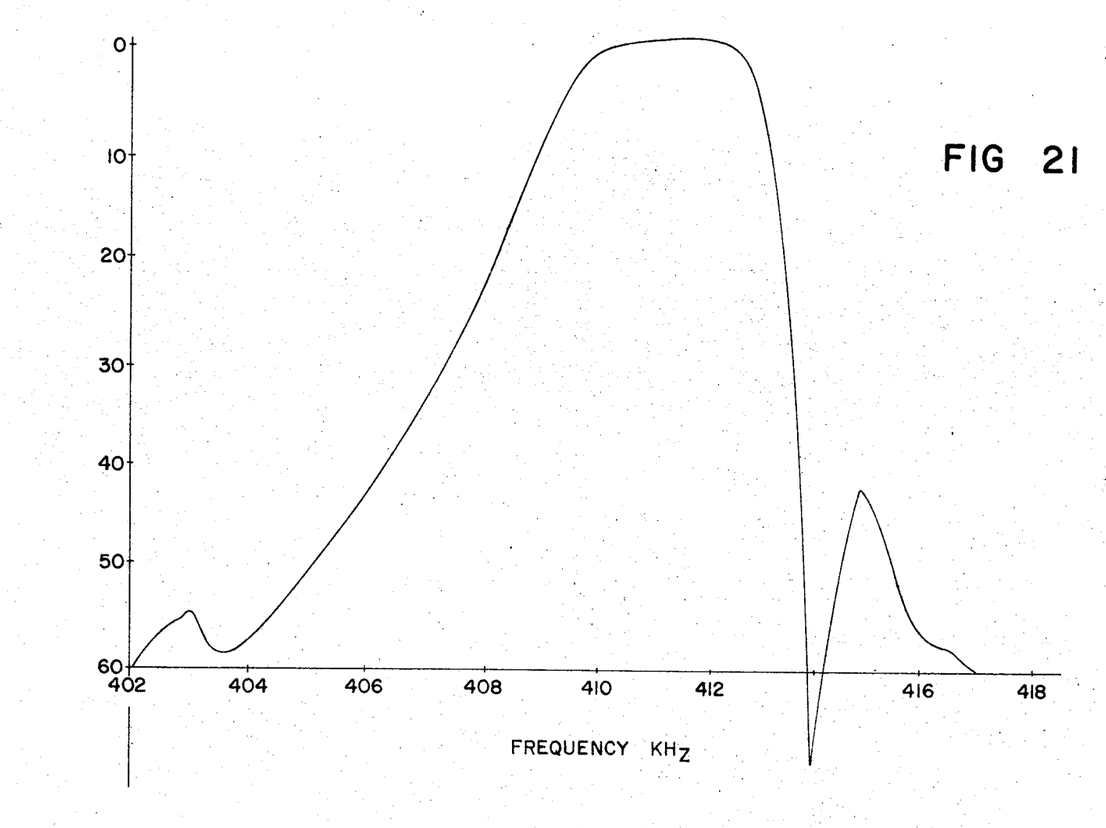
FIG. 21 is a frequency response curve of a mechanical filter section employing a multi-diameter mode type disc.

In FIG. 20 there is shown an equivalent circuit of the effect of the five diameter mode of FIG. 11, which equivalent circuit could be added to the center section of the circuit of FIG. 4. However, as will be discussed below, the effect of the five diameter mode is eliminated so that it is not necessary to consider the circuit of FIG. 20 in that of FIG. 4.

Figure 19:
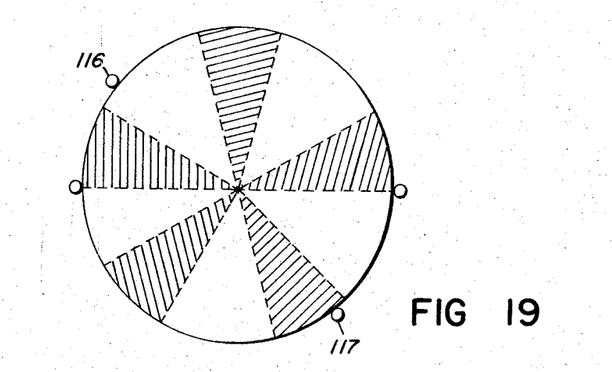
FIG. 19 shows another diameter mode of resonance of a disc which could produce spurious responses if the positioning of the coupling wires were not properly selected.

In FIG. 20 the tank circuit 115 represents the disc of FIG. 19 at the five diameter mode frequency of operation. Transformers 116 and 117 represent the connections of a pair of oppositely positioned coupling wires and the currents $i_1$ and $i_3$ represent equal forces applied to oppositely phased segments of the disc of FIG. 11, as for example, by the coupling wires 116 and 117. The forces represented by the currents $i_1$ and $i_3$ are equal because the impedance looking into the five diameter mode transformer primaries 116' and 117' are identical, even though the phases are opposite.

Since the secondary currents $i_2$ and $i_4$ are equal and in the direction shown in FIG. 12, there will be no current flowing through tank circuit 115. Hence, tank circuit 115 has the appearance of an open circuit and can be ignored.

Figure 22:
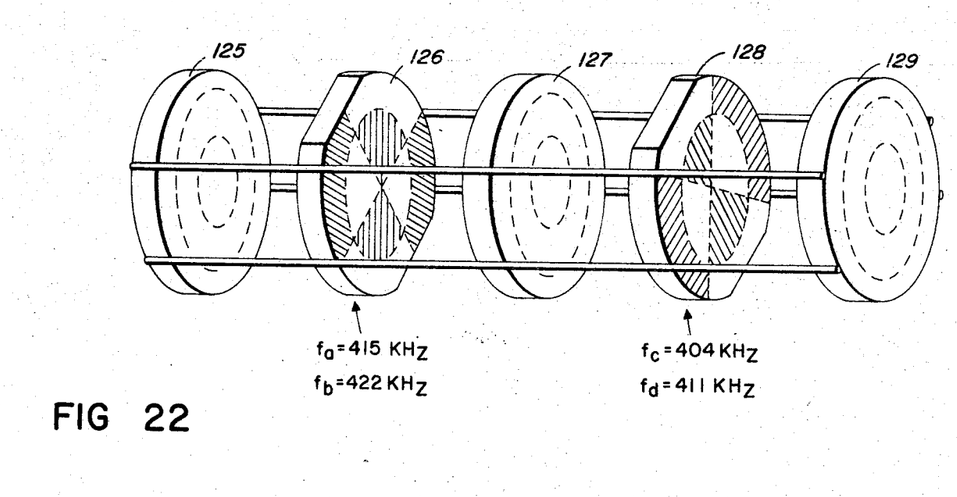
FIG. 22 is a perspective view of a five-disc mechanical filter employing multi-diameter mode discs wherein one of said multi-mode discs produces an attenuation pole at the lower end of the passband and the other multimode disc produces an attenuation pole at the upper end of the passband.

Referring now to FIG. 22, there is shown a five-disc mechanical filter employing two multi-diameter mode discs, one of which functions to produce an attenuation pole at the lower edge of the passband and the other one which functions to produce an attenuation pole at the upper edge of the passband.

Figure 23:
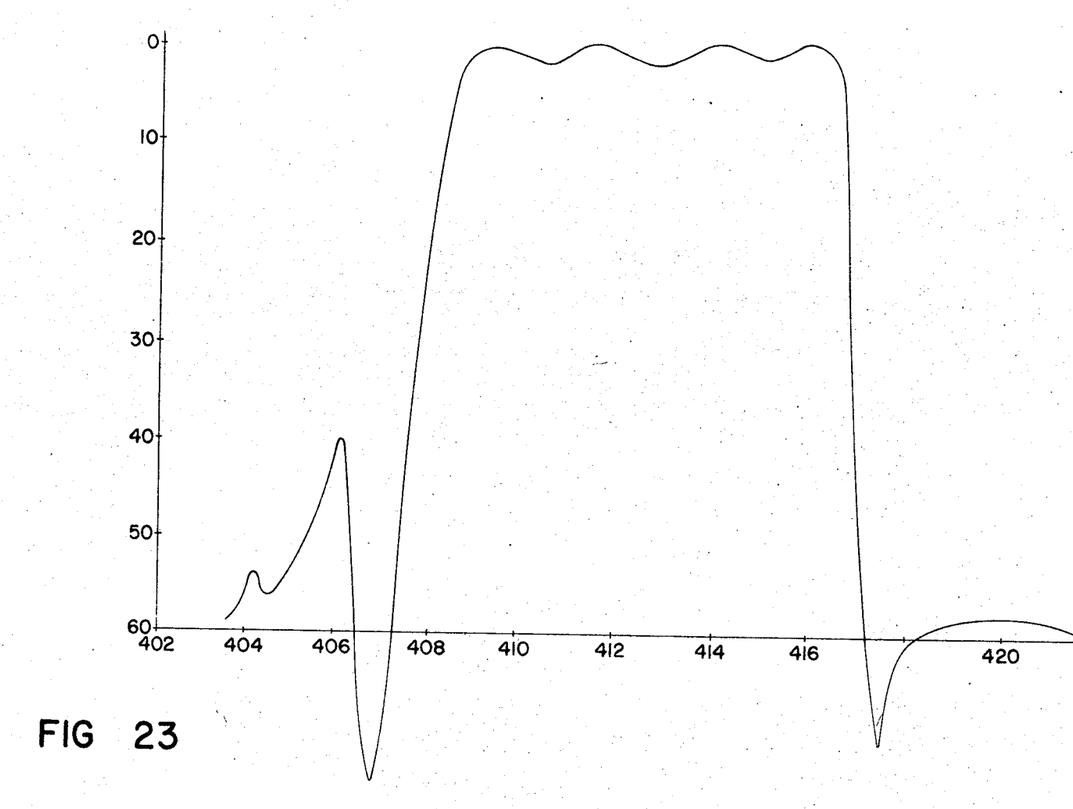
FIG. 23 is a frequency response curve of the filter of FIG. 22.

More specifically, in FIG. 22 discs 125, 127, and 129 can be conventional 2-circle mode type discs. The two remaining discs 126 and 128 are multi-diameter mole type discs, such as shown in FIG. 2 and FIG. 3. However, one of the multi-mode discs 126 has its two frequencies, as indicated in FIG. 22, at 415 kHz. and 422 kHz., with the attenuation pole occurring at about 417.5 kHz. just above the upper edge of the passband shown in FIG. 23.

The other multi-diameter mode disc 128 has its two circle-diameter mode resonant frequencies at 404 kHz. and 411 kHz., with an attenuation pole occurring substantially midway therebetween to define the lower edge of the passband shown in FIG. 3.

It is to be understood that the forms of the invention shown and described herein are but preferred embodiments thereof and that various combinations of multi-mode and circular discs may be employed without departing from the spirit or the scope of the invention.

I claim:

1. A mechanical filter of the stacked disc type comprising:
   first and second circle mode type discs;
   a third multi-diameter mode type disc having a first diameter mode and a second diameter mode of vibration and positioned between said first and second circle mode type discs with all three discs having their axes lying along a common line and spaced apart a distance less than the wavelength of the nominal center frequency of the filter passband;
   first coupling wire means extending along the stack of discs and secured to the perimeters of said first and second discs and to the perimeter of said multi-diameter mode disc at a diameter nodal line of a first diameter mode;
   second coupling wire means extending along the stack of discs and secured to the perimeters of said first and second discs and to the perimeter of said multi-diameter mode disc at a diameter nodal line of said second diameter mode.

2. A mechanical filter in accordance with claim 1 in which said third multi-diameter mode type disc is constructed to have said first diameter mode frequency of vibration occur within the passband of said filter and said second diameter mode frequency of vibration occur outside said passband with an attenuation pole occurring therebetween and just outside the edge of the passband.

3. In a mechanical filter of the stacked disc type comprising:
   first and second circle mode type discs;
   a third multi-diameter mode type disc having a first diameter mode and a second diameter mode of vibration and positioned between said first and second circle mode type discs with all three discs having their axes lying along a common line and spaced apart a distance less than the nominal center frequency of filter passband;
   first rod-like means extending along the stack of discs and securing the perimeters of said first and second discs to the perimeter of said multi-diameter mode disc at a diameter nodal line of a first diameter mode;
   second rod-like means extending along the stack of discs and securing the perimeters of said first and second discs to the perimeter of said multi-diameter mode disc at a diameter nodal line of said second diameter mode.

4. A mechanical filter in accordance with claim 3 in which said third multi-diameter mode type disc is constructed to have said first diameter mode frequency of vibration occur within the passband of said filter and said second diameter mode frequency of vibration occur outside said passband with an attenuation pole occurring therebetween and just outside the edge of the passband.

5. A mechanical filter of the stacked disc type comprising:
   a first plurality of circle mode type discs;
   first and second multi-diameter mode type discs, each positioned between two of said circle mode discs with all of said discs having their axes lying along a common line and spaced apart a distance less than the wavelength of the nominal center frequency of said passband;
   said first multi-diameter mode disc having resonant vibrations occurring in a first diameter mode at frequency $f_1$ lying within the passband and in a second diameter mode at frequency $f_2$ lying below the passband;
   said second multi-diameter mode disc having resonant vibrations occurring in a first diameter mode at frequency $f_3$ lying within the passband and in a second diameter mode at frequency $f_4$ lying above the passband;
   first coupling wire means connected to the perimeters of said circle mode discs and to the perimeters of said first and second diameter mode discs at diameter nodal lines of said first diameter modes;
   second coupling wire means connected to the perimeters of said circle mode discs and to the perimeters of said first and second diameter mode discs at diameter nodal lines of said second diameter modes.

6. A mechanical filter in accordance with claim 5 in which:
   said first multi-diameter mode type disc is constructed to have an attenuation pole occur just below the lower edge of the filter passband and between said vibration frequencies $f_1$ and $f_2$;
   and said second multi-diameter mode type disc is constructed to have an attenuation pole occur just above the upper edge of the filter passband and between said vibration frequencies $f_3$ and $f_4$.

7. In a mechanical filter of the stacked disc type comprising:
   a first plurality of circle mode type discs;
   first and second multi-diameter mode type discs, each positioned between two of said circle mode discs with all of said discs having their axes lying along a common line and spaced apart a distance less than the wavelength of the nominal center frequency of said passband;
   said first multi-diameter mode disc having resonant vibrations occurring in a first diameter mode at frequency $f_1$ lying within the passband and in a second diameter mode at frequency $f_2$ lying below the passband;
   said second multi-diameter mode disc having resonant vibrations occurring in a first diameter mode at frequency $f_3$ lying within the passband and in a second diameter mode at frequency $f_4$ lying above the passband;

first rod-like means connecting the perimeters of said circle mode discs to the perimeters of said first and second diameter mode discs at diameter nodal lines of said first diameter modes;

second rod-like means connecting the perimeters of said circle mode discs to the perimeters of said first and second diameter mode discs at the diameter nodal lines of said second diameter modes.

8. A mechanical filter in accordance with claim 7 in which:

said first multi-diameter mode type disc is constructed to have an attenuation pole occur just below the lower edge of the filter passband and between said vibration frequencies $f_1$ and $f_2$;

and said second multi-diameter mode type disc is constructed to have an attenuation pole occur just above the upper edge of the filter passband and between said vibration frequencies $f_3$ and $f_4$.

References Cited

UNITED STATES PATENTS

| 3,135,933 | 6/1964 | Johnson | 333—71 |
| 3,439,295 | 4/1969 | Bise | 333—72 X |
| 3,440,572 | 4/1969 | Bise | 333—71 X |
| 3,440,574 | 4/1969 | Johnson et al. | 333—71 X |

OTHER REFERENCES

Johnson & Teske, "A Mechanical Filter Having General Stopband Characteristics,'" IEEE Transactions On Sonics and Ultrasonics, July 1966, pp. 42 and 44.

HERMAN KARL SAALBACH, Primary Examiner

T. J. VEZEAU, Assistant Examiner